(12) United States Patent
Yamaura

(10) Patent No.: US 9,711,811 B2
(45) Date of Patent: Jul. 18, 2017

(54) END PLATE OF FUEL CELL

(71) Applicant: TOYOTA BOSHOKU KABUSHIKI KAISHA, Aichi-ken (JP)

(72) Inventor: Kunihiro Yamaura, Tokai (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 155 days.

(21) Appl. No.: 14/919,227

(22) Filed: Oct. 21, 2015

(65) Prior Publication Data

US 2016/0126567 A1    May 5, 2016

(30) Foreign Application Priority Data

Oct. 31, 2014   (JP) .................................. 2014-223672

(51) Int. Cl.
  *H01M 8/04119*   (2016.01)
  *H01M 8/2465*    (2016.01)

(52) U.S. Cl.
  CPC ..... *H01M 8/04164* (2013.01); *H01M 8/2465* (2013.01)

(58) Field of Classification Search
  None
  See application file for complete search history.

(56) References Cited

FOREIGN PATENT DOCUMENTS

JP         2014-44797         3/2014

*Primary Examiner* — Patrick Ryan
*Assistant Examiner* — Carmen Lyles-Irving
(74) *Attorney, Agent, or Firm* — Greenblum & Bernstein, P.L.C.

(57) ABSTRACT

An end plate arranged on one end of a fuel cell unit includes a plate body, which is formed from a metal material, and a gas-liquid separator, which includes a housing into which emission from the fuel cell unit is drawn in. The gas-liquid separator separates water from the emission and drains the separated water out of the housing. The housing is formed from a resin material and is in contact with the plate body.

6 Claims, 4 Drawing Sheets

END PLATE OF FUEL CELL

BACKGROUND ART

The present invention relates to an end plate of a fuel cell including a gas-liquid separator. The gas-liquid separator draws emission from a fuel cell unit into a housing and separates water from the emission. The gas-liquid separator then drains the separated water out of the housing.

A fuel cell device includes a fuel cell stack including a fuel cell unit and two end plates (refer to, for example, Japanese Laid-Open Patent Publication No. 2014-44797). The fuel cell unit is formed by stacking cells. The fuel cell unit is held between the two end plates in the stacked direction of the cells.

The fuel cell stack described in the publication includes passages for fuel gas (e.g., hydrogen) and oxidation gas (e.g., air) that are supplied to the fuel cell unit. The fuel cell stack also includes emission passages for draining surplus fuel gas and oxidation gas out of the fuel cell unit. The fuel gas emission passage includes a gas-liquid separator that draws in the fuel gas emitted from the fuel cell unit (hereafter, referred to as the emission) and separates water from the emission. The gas-liquid separator is coupled to an outer surface of one of the end plates via a pipe. The water, which is separated from the emission by the gas-liquid separator, is drained out of the housing from a drain valve and collected in a dilution box.

In Japanese Laid-Open Patent Publication No. 2014-44797, the gas-liquid separator projects out of the end plate. Thus, if the ambient temperature falls to the freezing temperature when the fuel cell device is not operating, the water vapor in the emission may condense and the condensed water may freeze. The frozen condensed water may cause the drain valve to become stuck. As a result, when the fuel cell device restarts operation, the stuck valve may hinder the drainage of water out of the housing.

It is an object of the present invention to provide an end plate for a fuel cell that limits situations in which a drain valve, which drains water out of a housing, becomes stuck at an early stage due to the freezing of condensed water.

To achieve the above object, an end plate arranged on one end of a fuel cell unit includes a plate body and a gas-liquid separator. The plate body is formed from a metal material. The gas-liquid separator includes a housing into which emission from the fuel cell unit is drawn in. The gas-liquid separator separates water from the emission and drains the separated water out of the housing. The housing is formed from a resin material and is in contact with the plate body.

In this structure, the housing of the gas-liquid separator is in contact with the plate body. This effectively transfers the heat of the fuel cell unit to the housing and impedes cooling of the housing by the ambient air. Thus, the temperature of the housing gradually decreases after the fuel cell device stops operating. This limits early condensation of the water vapor in the emission, which, in turn, limits early freezing of the condensed water.

DETAILED DESCRIPTION OF THE EMBODIMENTS

One embodiment will now be described with reference to FIGS. 1 to 7. The upper and lower directions as viewed in FIGS. 1 to 4, 6, and 7 correspond to the vertical direction.

Figure 1:
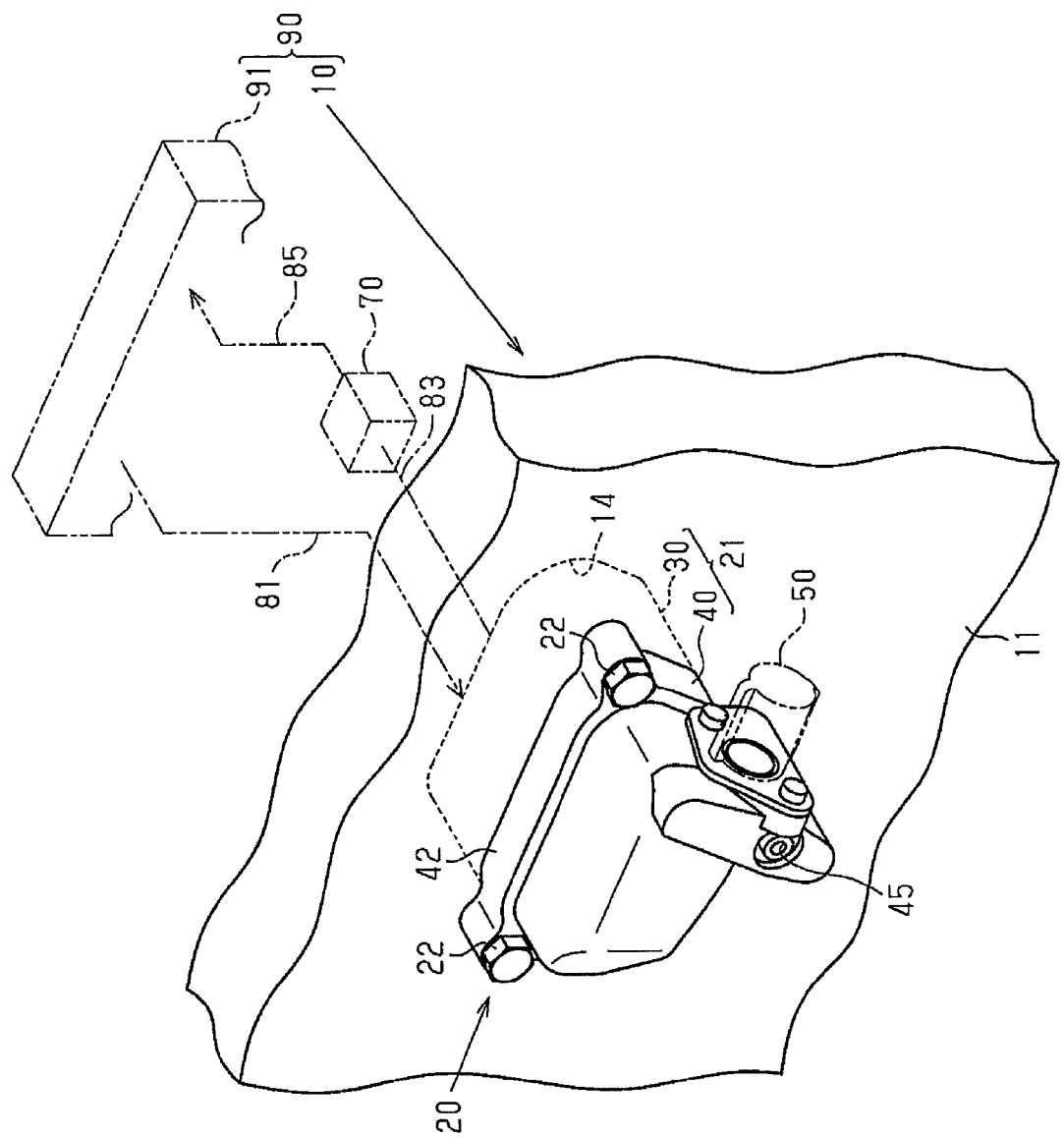
FIG. 1 is a perspective view showing one embodiment of an end plate of a gas-liquid separator.

As shown in FIG. 1, a fuel cell device, which is installed in a vehicle, includes a fuel cell stack 90. The fuel cell stack 90 includes a polymer electrolyte fuel cell unit 91 and two end plates 10. The fuel cell unit 91 is formed by stacking cells (not shown). The fuel cell unit 91 is held between the two end plates 10 in the stacked direction of the cells. FIG. 1 shows only one of the two end plates 10 located on one end of the fuel cell unit 91. In FIG. 1, the end plate 10 is shown separated from the fuel cell unit 91.

The structure for circulating fuel gas will now be described focusing on the end plate 10. In the present embodiment, hydrogen is used as the fuel gas.

As shown in FIGS. 1, 2, 5 and 6, the end plate 10 includes a plate body 11 formed from a metal material such as aluminum. Through holes 14 extend through the plate body 11 in the thickness direction of the plate body 11.

As shown in FIG. 1, the fuel cell stack 90 includes an emission passage 81, which emits fuel gas (hereinafter referred to as the emission) out of the fuel cell unit 91, and a gas-liquid separator 20, which separates water from the emission delivered through the emission passage 81. The fuel cell stack 90 also includes a connection passage 83, which connects the gas-liquid separator 20 and a pump 70, and a return passage 85, which connects the pump 70 and the fuel cell unit 91. The return passage 85 returns emission from the gas-liquid separator 20 to the fuel cell unit 91.

The structure of the gas-liquid separator 20 will now be described.

Figure 4:
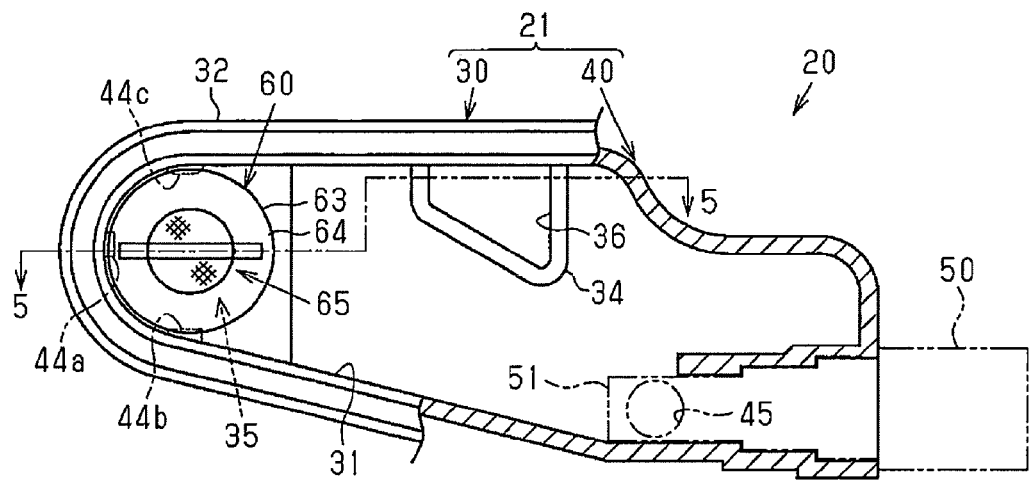
FIG. 4 is a cross-sectional view of the gas-liquid separator.
Figure 5:
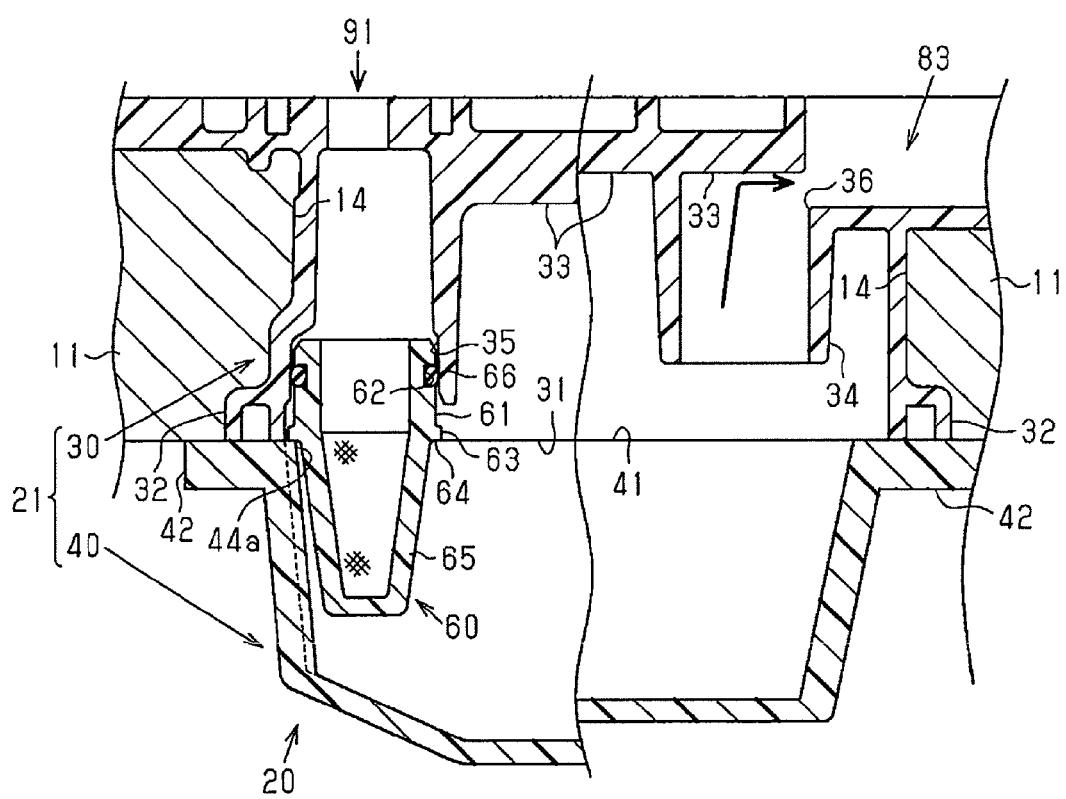
FIG. 5 is an enlarged cross-sectional view taken along line 5-5 in FIG. 4.

As shown in FIGS. 1, 4, and 5, the gas-liquid separator 20 includes a housing 21. The housing 21 includes a case 30 and a cap 40, which covers an open end 31 of the case 30. The case 30 and the cap 40 are each formed from a hard resin material.

Figure 2:
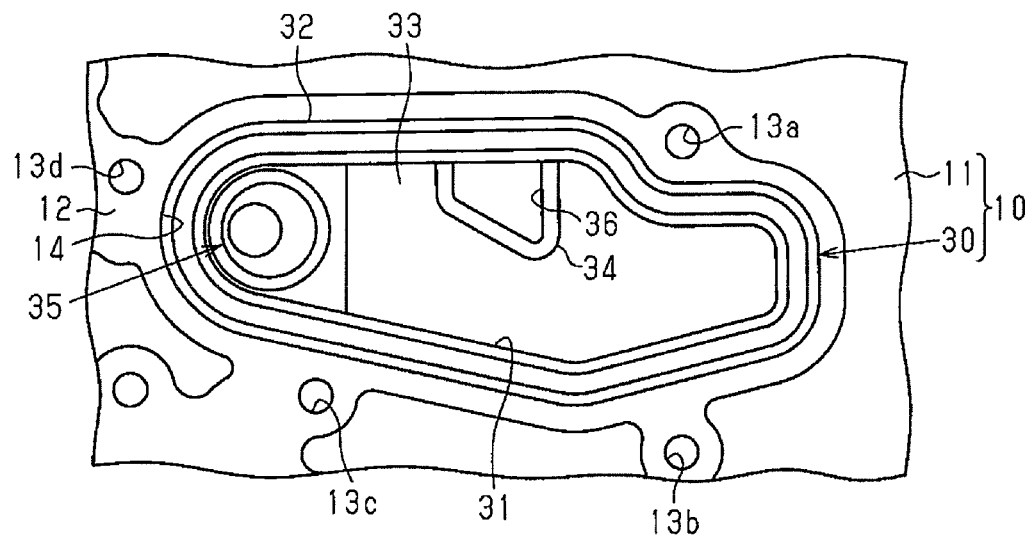
FIG. 2 is a front view showing the inner side of a case of the gas-liquid separator.

Referring to FIGS. 1, 2, and 5, the case 30 is insert-molded and formed integrally with the plate body 11 so as to be accommodated in one of the through holes 14 of the plate body 11. As shown in FIGS. 2, 4, and 5, the case 30 includes an open end 31 located in an outer surface, or front surface, of the end plate 10. A flange 32 projects toward the outer side from the open end 31. The case 30 includes an emission inlet 35, which extends through the end plate 10 and is located adjacent to the inner edge of the flange 32. The emission inlet 35 is connected to the emission passage 81.

As shown in FIGS. 2, 4, and 5, the case 30 includes an opposing surface 33, which opposes the cap 40, and an extension 34, which extends from the opposing surface 33 toward the cap 40. The extension 34 is generally U-shaped in a front view. The extension 34 forms an emission outlet 36 that extends through the end plate 10. The emission outlet 36 is connected to the connection passage 83.

As shown in FIG. 2, the plate body 11 includes a seat surface 12 surrounding the flange 32. The seat surface 12 includes threaded holes 13a to 13d that are spaced apart from one another.

As shown in FIGS. 4 and 5, a filter 60 is fitted into the emission inlet 35 from an inner side of the housing 21. The filter 60 captures foreign matter that enters the housing 21 from the emission passage 81.

As shown in FIG. 5, the filter 60 includes a tubular basal portion 61, which is fitted into the emission inlet 35, and a filtering portion 65, which is arranged on the distal end of the basal portion 61. The filtering portion 65 is partially meshed. The basal portion 61 and the filtering portion 65 are formed from a resin material. The outer surface of the basal portion 61 includes an annular groove 62. An O-ring 66 is fitted to the annular groove 62 to seal the gap between the outer surface of the basal portion 61 and the wall of the emission inlet 35. A large diameter portion 63 extends around the distal end of the basal portion 61.

Figure 3:
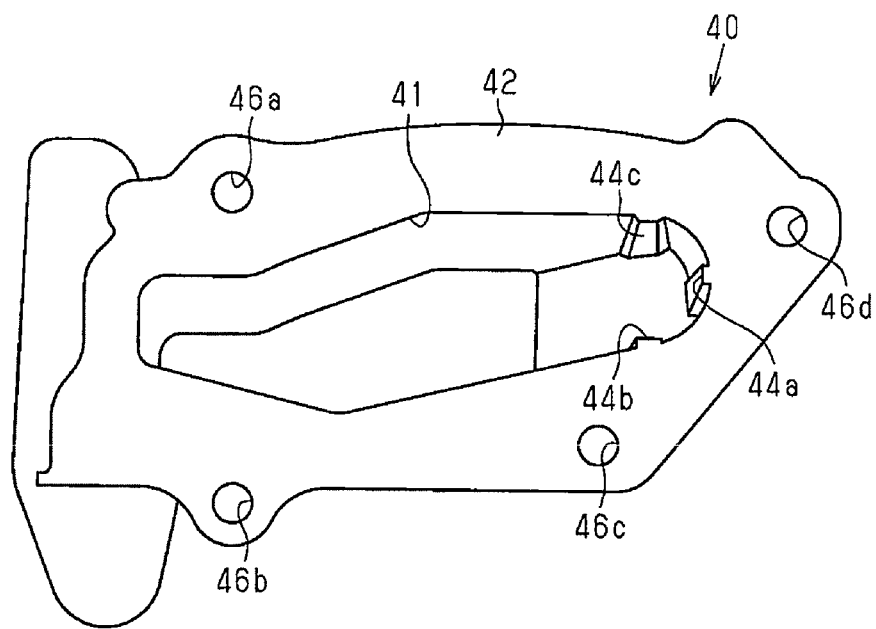
FIG. 3 is a front view showing the inner side of a cap of the gas-liquid separator.

As shown in FIGS. 3 and 5, the cap 40 includes an open end 41, and a flange 42 projects toward the outer side from the open end 41. The flange 42 includes bolt holes 46a to 46d respectively located at positions corresponding to the threaded holes 13a to 13d of the seat surface 12.

As shown in FIGS. 1 and 4, the cap 40 includes a drain port 45. The water separated from the emission is drained out of the housing 21 from the drain port 45. The cap 40 further includes a drain valve 50 that opens and closes the drain port 45. The drain valve 50 includes a valve member 51 that is moved by an actuator (not shown) in the sideward direction as viewed in FIG. 4 to open or close the drain port 45.

Bolts 22 are inserted through the bolt holes 46a to 46d of the cap 40 and tightened to the threaded holes 13a to 13d of the plate body 11 to fasten the cap 40 to the plate body 11, as shown in FIG. 1. A seal (not shown) is located between the flange 32 of the case 30 and the flange 42 of the cap 40 and between the seat surface 12 of the plate body 11 and the flange 42 of the cap 40.

As shown in FIGS. 3 and 4, three projections 44a to 44c project from the inner edge of the flange 42 of the cap 40 at equal intervals. The projections 44a to 44c extend to the bottom surface of the cap 40. As shown in FIG. 5, the projection 44a abuts on an end surface 64 of the large diameter portion 63 of the filter 60. In the same manner as the projection 44a, the other two projections 44b and 44c abut on the end surface 64 of the filter 60 (refer to FIG. 4). More specifically, end surfaces of the projections 44a to 44c are opposed to the end surface 64 of the large diameter portion 63 of the filter 60 in the direction in which the filter 60 is fitted into the emission inlet 35 (vertical direction as viewed in FIG. 5). Thus, the projections 44a to 44c restrict separation of the filter 60 from the emission inlet 35.

The structures of the pump 70, the connection passage 83, and the return passage 85 will now be described.

Figure 6:
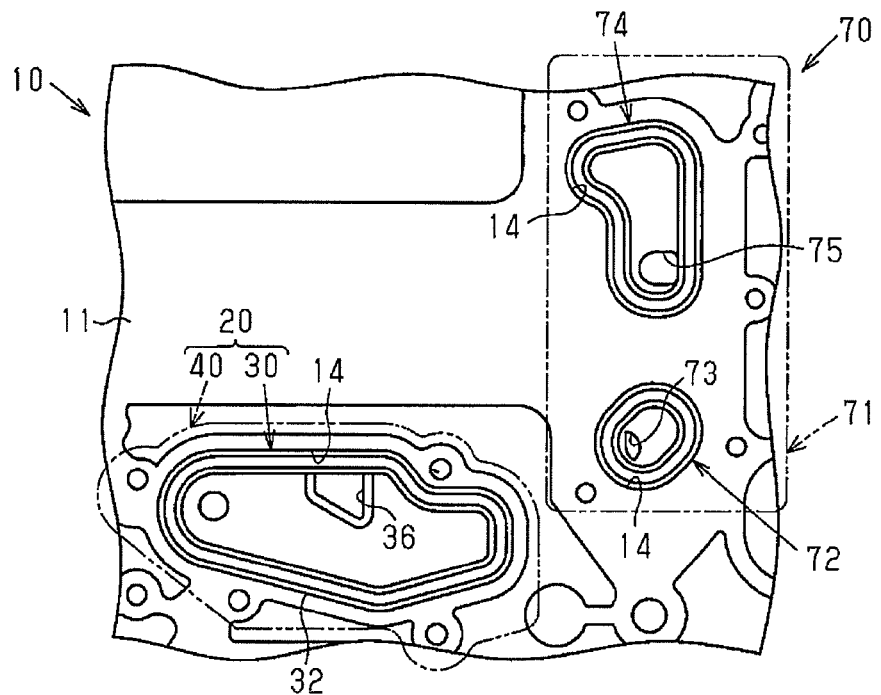
FIG. 6 is a front view of the end plate shown in FIG. 1.

As shown in FIG. 6, the pump 70 includes a pump body 71, a suction unit 72, and a discharge unit 74. The pump body 71 includes a driver (not shown). The suction unit 72 includes a suction port 73 through which emission is drawn into the pump body 71. The discharge unit 74 includes a discharge port 75 through which emission is discharged out of the pump body 71. The suction unit 72 and the discharge unit 74 are formed from a hard resin material. Further, the suction unit 72 and the discharge unit 74 are each insert-molded and formed integrally with the plate body 11 so as to be accommodated in one of the through holes 14 of the plate body 11. The suction unit 72 and the discharge unit 74 open in the outer surface of the end plate 10. A flange, which is similar to the flange 32 of the case 30, extends around the open end of each of the suction unit 72 and the discharge unit 74. The pump body 71 is fastened to the plate body 11 by bolts (not shown).

Figure 7:
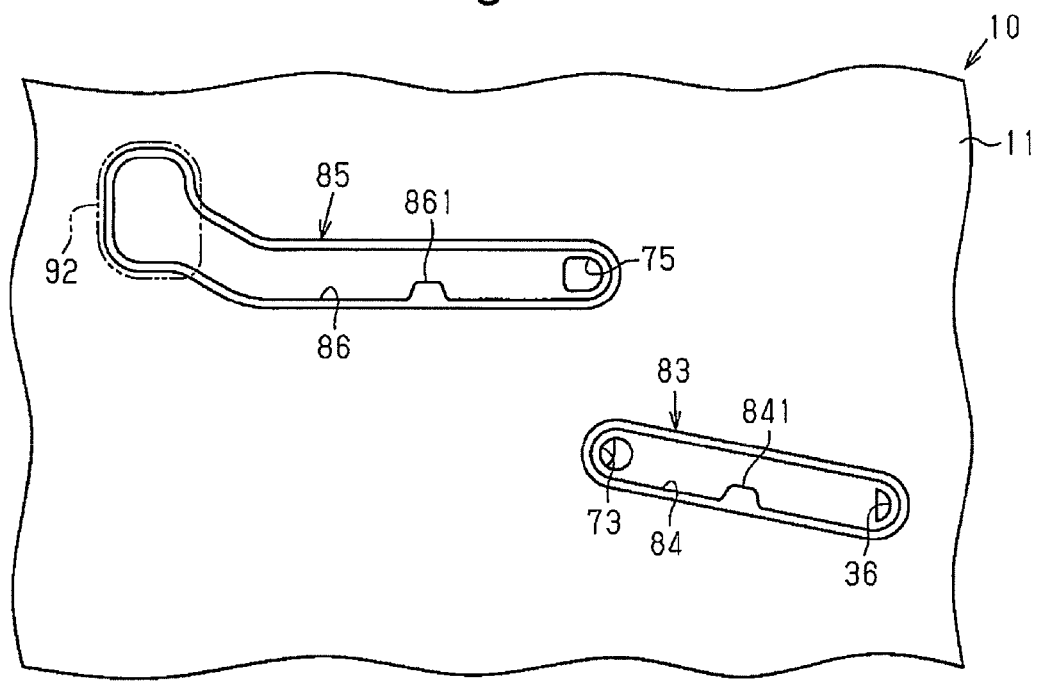
FIG. 7 is a rear view of the end plate shown in FIG. 1.

As shown in FIG. 7, the inner surface, or rear surface, of the end plate 10 includes the connection passage 83 that connects the emission outlet 36 of the case 30 and the suction port 73 of the pump 70. The connection passage 83, which is formed from a hard resin material, is insert-molded and formed integrally with the plate body 11. The connection passage 83 includes a bottom surface 84 that is upwardly sloped to the suction port 73, or the pump 70. The bottom surface 84 includes a first restriction projection 841. The first restriction projection 841 functions as a first restriction that restricts movement of water toward the emission outlet 36, or the housing 21 of the gas-liquid separator 20.

The inner surface of the end plate 10 includes the return passage 85 that returns the emission discharged out of the pump 70 from the discharge port 75 toward a supply passage 92, which supplies fuel gas and opens in the end surface of the fuel cell unit 91. The return passage 85, which is formed from a hard resin material, is insert-molded and formed integrally with the plate body 11. The return passage 85 has a bottom surface 86 that includes a second restriction projection 861. The second restriction projection 861 functions as a second restriction that restricts the movement of water toward the discharge port 75, or the pump 70.

The connection passage 83 and the return passage 85 are both open as viewed in FIG. 7 but are closed by the end surface of the fuel cell unit 91 that is adjacent to the inner surface of the end plate 10.

The operation of the present embodiment will now be described.

In the gas-liquid separator 20, the housing 21 is in contact with the plate body 11 of the end plate 10. This effectively transfers the heat of the fuel cell unit 91 to the housing 21 and impedes cooling of the housing 21 by the ambient air. Thus, the temperature of the housing 21 gradually decreases after the fuel cell device stops operating. This limits early condensation of the water vapor in the emission, which, in turn, limits early freezing of the condensed water. Thus, situations are avoided in which the drain valve 50 becomes stuck due to the freezing of condensed water.

Further, the above structure effectively transfers heat from the fuel cell unit 91 to the housing 21 after the fuel cell device restarts operation. This quickly increases the temperature of the housing 21. If the drain valve 50 is stuck due to the freezing of condensed water, this would promptly release the drain valve 50 and allow the drain valve 50 to function normally.

The end plate of the fuel cell has the advantages described below.

(1) The housing 21 of the gas-liquid separator 20 is in contact with the plate body 11 of the end plate 10.

In this structure, heat effectively transferred from the fuel cell unit 91 to the housing 21 impedes cooling of the housing 21 by the ambient air and gradually decreases the temperature of the housing 21 after the fuel cell device stops operating. This limits early condensation of the water vapor in the emission, which, in turn, limits early freezing of the condensed water. Thus, situations are avoided in which the drain valve 50 becomes stuck due to the freezing of condensed water.

Further, the above structure effectively transfers heat from the fuel cell unit 91 to the housing 21 after the fuel cell device restarts operation. This quickly increases the temperature of the housing 21. If the drain valve 50 is stuck due to the freezing of condensed water, this would promptly release the drain valve 50 and allow the drain valve 50 to function normally.

(2) The housing 21 includes the case 30, which is formed integrally with the plate body 11, and the cap 40, which covers the open end 31 of the case 30. The case 30 includes the emission inlet 35, which extends through the end plate 10. The cap 40 includes the drain port 45, which drains the water separated from the emission out of the housing 21.

This structure differs from a structure in which a housing of a gas-liquid separator is a component separate from an end plate in that there is no need for a pipe to connect an emission passage, which extends through the end plate, and the housing of the gas-liquid separator. This reduces the number of components in the fuel cell stack 90, which is applied to the end plate 10, and simplifies the structure of the fuel cell stack 90.

(3) The case 30 is accommodated in the corresponding through hole 14 of the plate body 11 and formed integrally with the plate body 11.

In this structure, the case of the housing may easily be formed integrally with the plate body.

(4) The case 30 includes the extension 34 that extends from the opposing surface 33, which opposes the cap 40, toward the cap 40. The extension 34 includes the emission outlet 36 that extends through the end plate 10.

The emission, from which water is separated in the housing 21, is returned from the emission outlet 36 toward the pump 70, or the fuel cell unit 91. In this structure, as shown by the arrow in FIG. 5, the emission in the housing 21 easily strikes the opposing surface 33 of the case 30. Thus, the opposing surface 33 functions to efficiently separate water from the emission. This improves the performance of the gas-liquid separator 20.

(5) The connection passage 83 in the rear surface of the end plate 10 connects the emission outlet 36 to the pump 70. The bottom surface 84 of the connection passage 83 is upwardly sloped to the pump 70.

The pump 70 draws in the emission, from which water is separated in the housing 21. Thus, the emission flows from the emission outlet 36 through the connection passage 83. The emission that flows through the connection passage 83 includes water that was not separated by the gas-liquid separator 20. In the above structure, the bottom surface 84 blocks the movement of water toward the pump 70 in the connection passage 83 so that the water is apt to fall toward the housing 21. This reduces water that remains in the pump 70 after the fuel cell device stops operating and reduces situations in which the pump 70 becomes stuck due to the freezing of water.

(6) The bottom surface 84 of the connection passage 83 includes the first restriction projection 841 that restricts movement of water toward the housing 21 of the gas-liquid separator 20.

When the water in the connection passage 83 returns to the housing 21 of the gas-liquid separator 20 after the fuel cell device stops operating, the amount of water collected in the housing 21 increases. Thus, the drain valve 50 may become stuck when the water in the housing 21 freezes.

In this regard, the first restriction projection 841 on the bottom surface 84 restricts the movement of water toward the housing 21 in the connection passage 83. This limits increases in the amount of water collected in the housing 21 and reduces situations in which the drain valve 50 becomes stuck due to the freezing of water.

(7) The emission discharged from the pump 70 is returned to the fuel cell unit 91 through the return passage 85 that is formed in the rear surface of the end plate 10. The bottom surface 86 of the return passage 85 includes the second restriction projection 861 that restricts movement of water toward the pump 70.

The pump 70 may become stuck when the water collected in the pump 70 freezes. In this regard, the second restriction projection 861 restricts the movement of water along the bottom surface 86 toward the pump 70 in the return passage 85. This reduces the water collected in the pump 70 and reduces situations in which the pump 70 becomes stuck due to the freezing of water.

(8) The connection passage 83 and the return passage 85 are formed integrally with the plate body 11 of the end plate 10. This reduces the number of components in the fuel cell stack 90 to which the end plate 10 is applied. Thus, the structure of the fuel cell stack 90 may be simplified.

The above embodiment may be modified as follows.

The bottom surface 86 of the return passage 85 may include a recess that functions as the second restriction.

In other words, the recess may restrict movement of water toward the housing 21 of the gas-liquid separator 20.

The bottom surface 84 of the connection passage 83 may include a recess that functions as the first restriction. In other words, the recess may restrict movement of water toward the pump 70.

The restriction projections 861 and 841 may be omitted from the return passage 85 and the connection passage 83.

The bottom surface 84 of the connection passage 83 may be horizontal.

The emission outlet 36 of the gas-liquid separator 20 may be formed to extend through only the opposing surface 33.

The case 30 may be a component that is separate from the plate body 11, and the case 30 may abut on the plate body 11.

The invention claimed is:

1. An end plate arranged on one end of a fuel cell unit, the end plate comprising:
    a plate body formed from a metal material; and
    a gas-liquid separator including a housing into which emission from the fuel cell unit is drawn in, wherein the gas-liquid separator separates water from the emission and drains the separated water out of the housing;
    wherein the housing is formed from a resin material and is in contact with the plate body, wherein
    the housing includes a case, which is formed integrally with the plate body and includes an open end, and a cap, which covers the open end of the case;
    the case includes an emission inlet extending through the end plate; and
    the cap includes a drain port that drains the separated water out of the housing.

2. The end plate according to claim 1, wherein
    the plate body includes a through hole, and
    the case is accommodated in the through hole and formed integrally with the plate body.

3. The end plate according to claim 1, wherein
    the case includes an opposing surface, which opposes the cap, and an extension, which extends toward the cap from the opposing surface;
    the extension includes an emission outlet that extends through the end plate;
    the emission from the housing is drawn into a pump through the emission outlet and is discharged toward the fuel cell unit by the pump; and the emission outlet is connected to the pump by a connection passage.

4. The end plate according to claim 3, wherein the connection passage includes a bottom surface that is upwardly sloped toward the pump.

5. The end plate according to claim 4, wherein the bottom surface of the connection passage includes a first restriction that restricts movement of water toward the housing.

6. The end plate according to claim 3, wherein the emission discharged from the pump is returned to the fuel cell unit through a return passage, and the return passage includes a bottom surface including a second restriction that restricts movement of water toward the pump.

\* \* \* \* \*